US012602257B2

(12) United States Patent
Rhu et al.

(10) Patent No.: US 12,602,257 B2
(45) Date of Patent: Apr. 14, 2026

(54) ELECTRONIC DEVICE AND OPERATING METHOD WITH MODEL CO-LOCATION

(71) Applicants: SAMSUNG ELECTRONICS CO., LTD., Suwon-si (KR); Korea Advanced Institute of Science and Technology, Daejeon (KR)

(72) Inventors: Minsoo Rhu, Daejeon (KR); Yujeong Choi, Daejeon (KR)

(73) Assignees: Samsung Electronics Co., Ltd., Suwon-si (KR); Korea Advanced Institute of Science and Technology, Daejeon (KR)

( * ) Notice: Subject to any disclaimer, the term of this patent is extended or adjusted under 35 U.S.C. 154(b) by 637 days.

(21) Appl. No.: 17/736,312

(22) Filed: May 4, 2022

(65) Prior Publication Data

US 2023/0097529 A1 Mar. 30, 2023

(30) Foreign Application Priority Data

Sep. 24, 2021 (KR) ........................ 10-2021-0126598

(51) Int. Cl.
*G06F 9/50* (2006.01)
*G06N 3/063* (2023.01)

(52) U.S. Cl.
CPC .......... *G06F 9/5044* (2013.01); *G06F 9/5016* (2013.01); *G06N 3/063* (2013.01); *G06F 2209/5019* (2013.01); *G06F 2209/503* (2013.01)

(58) Field of Classification Search
CPC ................. G06F 9/5044; G06F 9/5016; G06F 2209/5019; G06F 2209/503; G06F 9/5033; G06N 3/063; G06N 3/044; G06N 3/0464
See application file for complete search history.

(56) References Cited

U.S. PATENT DOCUMENTS

2016/0321776 A1* 11/2016 Zou .......................... G06F 9/522
2018/0293463 A1* 10/2018 Brown .................. G06F 3/0482
(Continued)

FOREIGN PATENT DOCUMENTS

| KR | 10-1765723 B1 | 8/2017 |
| KR | 10-2019-0054449 A | 5/2019 |
| KR | 10-2019-0113555 A | 10/2019 |
| KR | 10-2020-0110092 A | 9/2020 |

OTHER PUBLICATIONS

Gupta, Udit, et al. "Deeprecsys: A System for Optimizing End-to-End At-scale Neural Recommendation Inference." 2020 *ACM/IEEE 47th Annual International Symposium on Computer Architecture (ISCA). IEEE*, arXiv:2001.02772 vol. 1 [cs.DC] Jan. 8, 2020. pp. 1-14.

(Continued)

*Primary Examiner* — Tuan C Dao
(74) *Attorney, Agent, or Firm* — NSIP Law

(57) ABSTRACT

An electronic device to co-locating models and a method of operating the electronic device is provided. The electronic device includes one or more of processors configured to analyze computational characteristics in response to a plurality of models being located to an accelerator, determine an affinity representing a utilization of the accelerator in response to two models among the plurality of models being co-located based on the computational characteristics of the plurality of models, and co-locate the two models among the plurality of models to the accelerator based on the affinity.

15 Claims, 9 Drawing Sheets

(56) References Cited

U.S. PATENT DOCUMENTS

| | | | | |
|---|---|---|---|---|
| 2018/0341630 A1* | 11/2018 | DeVries | .................. | G06F 40/14 |
| 2019/0050265 A1* | 2/2019 | Vijayaraghavan | ....... | G06N 3/08 |
| 2019/0156247 A1* | 5/2019 | Faulhaber, Jr. | ........ | G06N 3/045 |
| 2019/0294998 A1* | 9/2019 | Kloepper | ............... | G06N 20/00 |
| 2019/0347125 A1* | 11/2019 | Sankaran | ........... | G06F 9/30181 |
| 2020/0117490 A1* | 4/2020 | Sengupta | ............. | G06F 3/0482 |
| 2020/0272907 A1* | 8/2020 | Jin | ......................... | G06N 3/084 |
| 2020/0327055 A1* | 10/2020 | Mao | ........................ | G11C 29/52 |
| 2020/0349925 A1* | 11/2020 | Shahid | .................... | G10L 15/08 |
| 2021/0012239 A1* | 1/2021 | Arzani | .................... | H04L 43/50 |
| 2021/0097429 A1* | 4/2021 | Jia | .......................... | G06N 20/00 |
| 2021/0160162 A1* | 5/2021 | Abbas | ................. | H04L 43/0817 |
| 2021/0255788 A1* | 8/2021 | Aggarwal | .............. | G06F 3/061 |
| 2021/0350280 A1* | 11/2021 | Montanari | ............. | G06N 20/00 |
| 2021/0374421 A1* | 12/2021 | Chakraborty | .......... | G06V 10/75 |
| 2022/0076145 A1* | 3/2022 | Yalla | ...................... | G06N 20/00 |
| 2022/0222177 A1* | 7/2022 | ChoFleming | ....... | G06F 11/3433 |
| 2022/0292262 A1* | 9/2022 | Japa | .................. | G06F 16/90332 |
| 2022/0374348 A1* | 11/2022 | Hazel | .................. | G06F 12/0607 |
| 2023/0119134 A1* | 4/2023 | Jreij | ........................ | G06F 21/10 726/26 |
| 2023/0161565 A1* | 5/2023 | Montemayor | .......... | G06F 9/451 717/109 |

OTHER PUBLICATIONS

Shen, Haichen, et al. "Nexus: A GPU Cluster Engine for Accelerating DNN-Based Video Analysis." *Proceedings of the 27th ACM Symposium on Operating Systems Principles*. Oct. 2019. pp. 322-337.

Zhao, Hanyu, et al. "HiveD: Sharing a GPU Cluster for Deep Learning with Guarantees." 14th *USENIX Symposium on Operating Systems Design and Implementation (OSDI* 20). Nov. 2020. pp. 515-532 (19 pages in English).

Choi, Yujeong, et al.. "Prema: A Predictive Multi-task Scheduling Algorithm For Preemptible Neural Processing Units." 2020 *IEEE International Symposium on High Performance Computer Architecture (HPCA). IEEE*, arXiv:1909.04548v1 [cs.DC] Sep. 6, 2019. pp. 1-15 (15 pages in English).

Ghodrati, Soroush, et al. "Planaria: Dynamic Architecture Fission for Spatial Multi-Tenant Acceleration of Deep Neural Networks." 2020 53rd *Annual IEEE/ACM International Symposium on Microarchitecture (MICRO). IEEE*, Nov. 2020. pp. 681-697 (17 pages in English).

Oh, Young H., et al. "Layerweaver: Maximizing Resource Utilization of Neural Processing Units via Layer-Wise Scheduling." 2021 *IEEE International Symposium on High-Performance Computer Architecture (HPCA). IEEE*, Apr. 2021. (14 pages in English).

Baek, Eunjin, et al.. "A Multi-Neural Network Acceleration Architecture." 2020 *ACM/IEEE* 47th *Annual International Symposium on Computer Architecture (ISCA). IEEE*, Jul. 2020. pp. 940- 953 (14 pages in English).

Gupta, Udit, et al. "The Architectural Implications of Facebook's DNN-based Personalized Recommendation." 2020 *IEEE International Symposium on High Performance Computer Architecture (HPCA). IEEE*, arXiv:1906.03109v4 [cs.DC] Feb. 15, 2020. (14 pages in English).

Lui, Michael, et al. "Understanding Capacity-Driven Scale-Out Neural Recommendation Inference." 2021 *IEEE International Symposium on Performance Analysis of Systems and Software (ISPASS). IEEE*, arXiv:2011.02084v2 [cs.DC] Nov. 11, 2020. (18 pages in English).

Yi, Xinyang, et al. "Factorized Deep Retrieval and Distributed Tensorflow Serving." ser. Conference on Machine Learning and Systems. 2018. (3 pages in English).

Korean Office Action issued on Jun. 25, 2025 in corresponding Korean Patent Application No. 10-2021-0126598 (2 pages in English and 4 pages in Korean).

\* cited by examiner

Computational characteristic analysis

Calculate model memory capacity ——310

Calculate model memory bandwidth ——320

Calculate model performance based on size of allocated intermediate buffer ——330

Store in computational characteristic table ——340

ELECTRONIC DEVICE AND OPERATING METHOD WITH MODEL CO-LOCATION

CROSS-REFERENCE TO RELATED APPLICATIONS

This application claims the benefit under 35 USC § 119(a) of Korean Patent Application No. 10-2021-0126598, filed on Sep. 24, 2021, in the Korean Intellectual Property Office, the entire disclosure of which is incorporated herein by reference for all purposes.

BACKGROUND

1. Field

The following description relates to an electronic device and operating method with model co-locating.

2. Description of Related Art

With the higher demand for artificial intelligence (AI), there is a growing need for a method of increasing a throughput of an AI model. Developments are being made in technology to increase a throughput of a model by implementing a plurality of models in an accelerator that performs AI computations.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, an electronic device includes one or more of processors, configured to: analyze computational characteristics in response to a plurality of models being located to an accelerator; determine an affinity representing a utilization of the accelerator in response to two models among the plurality of models being co-located to the accelerator based on the computational characteristics of the plurality of models; and co-locate the two models among the plurality of models to the accelerator based on the affinity.

The one or more of processors may be further configured to analyze a memory capacity and a bandwidth needed by each of the plurality of models, and a performance of each of the plurality of models based on a size of an allocated intermediate buffer as the computational characteristics.

The one or more of processors may be further configured to determine the affinity based on a determination that a sum of memory capacities of the two models among the plurality of models is greater than a memory capacity of the accelerator.

The one or more of processors may be further configured to determine the affinity based on a sum of bandwidths of the two models among the plurality of models, and a bandwidth of the accelerator.

The one or more of processors may be further configured to determine a result of dividing the bandwidth of the accelerator by the sum of the bandwidths of the two models among the plurality of models as a bandwidth coefficient reflected in the affinity in response to the sum of the bandwidths of the two models being greater than the bandwidth of the accelerator.

The one or more of processors may be further configured to determine a maximum bandwidth coefficient reflected in the affinity in response to the sum of the bandwidths of the two models among the plurality of models being equal to, or less than, the bandwidth of the accelerator.

The one or more of processors may be further configured to determine the affinity based on a sum of performances of the two models in response to an intermediate buffer of the accelerator being distributed to the two models among the plurality of models.

The one or more of processors may be further configured to determine an average of a sum of maximum performances of the two models among the plurality of models as an intermediate buffer coefficient reflected in the affinity in response to the intermediate buffer of the accelerator being distributed to the two models among the plurality of models.

The one or more of processors may be further configured to co-locate the two models among the plurality of models to the accelerator in response to the affinity being equal to, or greater than, a preset threshold.

The one or more of processors may be further configured to co-locate a first model in which a memory resource bottleneck occurs, and a second model in which the affinity with the first model is equal to, or greater than, a preset threshold among the plurality of models.

In a general aspect, a processor-implemented method includes analyzing computational characteristics in response to a plurality of models being located to an accelerator; determining an affinity representing a utilization of the accelerator in response to two models among the plurality of models being co-located to the accelerator based on the computational characteristic of the plurality of models; and co-locating the two models among the plurality of models to the accelerator based on the affinity.

The analyzing of the computational characteristics may include analyzing a memory capacity and a bandwidth needed by each of the plurality of models, and a performance of each of the plurality of models based on a size of an allocated intermediate buffer as the computational characteristics.

The determining of the affinity may include determining the affinity based on a determination that a sum of memory capacities of the two models among the plurality of models is greater than a memory capacity of the accelerator.

The determining of the affinity may include determining the affinity based on a sum of bandwidths of the two models among the plurality of models and a bandwidth of the accelerator.

The determining of the affinity may include determining a result of dividing the bandwidth of the accelerator by the sum of the bandwidths of the two models among the plurality of models as a bandwidth coefficient reflected in the affinity in response to the sum of the bandwidths of the two models being greater than the bandwidth of the accelerator.

The determining of the affinity may include determining the bandwidth coefficient reflected in the affinity in response to the sum of the bandwidths of the two models among the plurality of models being equal to, or less than, the bandwidth of the accelerator.

The determining of the affinity may include determining the affinity based on a sum of performances of the two models among the plurality of models in response to an intermediate buffer of the accelerator being distributed to the two models among the plurality of models.

The determining of the affinity may include determining an average of a sum of maximum performances of the two models as an intermediate buffer coefficient reflected in the affinity in response to the intermediate buffer of the accelerator being distributed to the two models among the plurality of models.

The co-locating may include co-locating a first model in which a memory resource bottleneck occurs and a second model in which an affinity with the first model is equal to, or greater than, a preset threshold among the plurality of models.

Other features and aspects will be apparent from the following detailed description, the drawings, and the claims.

Figure 1:
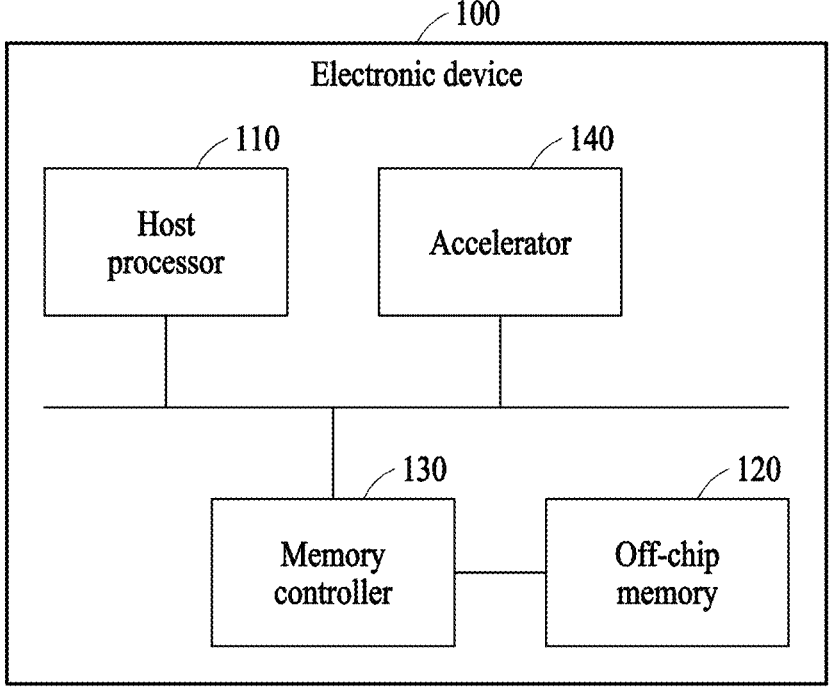
FIG. 1 illustrates an example electronic device, in accordance with one or more embodiments.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness, noting that omissions of features and their descriptions are also not intended to be admissions of their general knowledge.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

In addition, terms such as first, second, A, B, (a), (b), and the like may be used herein to describe components. Each of these terminologies is not used to define an essence, order, or sequence of a corresponding component but used merely to distinguish the corresponding component from other component(s).

Unless otherwise defined, all terms, including technical and scientific terms, used herein have the same meaning as commonly understood by one of ordinary skill in the art to which this disclosure pertains and after an understanding of the disclosure of this application. Terms, such as those defined in commonly used dictionaries, are to be interpreted as having a meaning that is consistent with their meaning in the context of the relevant art and the disclosure of this application, and are not to be interpreted in an idealized or overly formal sense unless expressly so defined herein.

Also, in the description of example embodiments, detailed description of structures or functions that are thereby known after an understanding of the disclosure of the present application will be omitted when it is deemed that such description will cause ambiguous interpretation of the example embodiments.

Hereinafter, examples will be described in detail with reference to the accompanying drawings. When describing the examples with reference to the accompanying drawings, like reference numerals refer to like components and a repeated description related thereto will be omitted.

FIG. 1 illustrates an example electronic device, in accordance with one or more embodiments.

Referring to FIG. 1, an example electronic device 100 may include a host processor 110, an off-chip memory 120, a memory controller 130, and an accelerator 140. The host processor 110, the off-chip memory 120, the memory controller 130, and the accelerator 140 may communicate with each other through a bus, a network on a chip (NoC), a peripheral component interconnect express (PCIe), and the like. The electronic device 100 may include, as non-limited examples, various computing devices such as a mobile phone, a smart phone, a tablet PC, an e-book device, a laptop, a personal computer (PC), and a server, various wearable devices such as a smart watch, smart eyeglasses, a head mounted display (HMD), or smart clothes, various home appliances such as a smart speaker, a smart television (TV), and a smart refrigerator, and other devices such as a smart vehicle, a smart kiosk, an Internet of things (IoT) device, a walking assist device (WAD), a drone, a robot, and the like.

The host processor 110 may control operations of components included in the electronic device 100 and may include, for example, a central processing unit (CPU), but is not limited thereto. The host processor 110 may control operations performed in the electronic device 100. The host processor 110 may also receive one or more requests for processing a neural network in the accelerator 140, generate a kernel including instructions executable in the accelerator 140 in response to the received requests, and transmit the generated kernel to the accelerator 140. The request may be made for a neural network-based data inference and to obtain a data inference result by allowing the accelerator 140 to execute the neural network to perform operations such as, but not limited to, object recognition, pattern recognition, computer vision, speech recognition, machine translation, machine interpretation, recommendation services, personalized services, image processing, autonomous driving, or the like.

The off-chip memory 120 may be located (or disposed) outside of the accelerator 140, and may be, for example, a dynamic random-access memory (DRAM), a high bandwidth memory (HBM), and the like implemented as a main memory of the electronic device 100, but is not limited to thereto. The off-chip memory 120 may store inference target data and/or parameters of the neural network to be executed in the accelerator 140, and data stored in the off-chip memory 120 may be transmitted to the accelerator 140 for an inference. The off-chip memory 120 may also be implemented in an example in which an on-chip memory or internal inside the accelerator 140 is not sufficient to execute the neural network in the accelerator 140.

Technological automation of pattern recognition or analyses, for example, has been implemented through processor implemented neural network models, as specialized computational architectures, that after substantial training may provide computationally intuitive mappings between input patterns and output patterns or pattern recognitions of input patterns. The trained capability of generating such mappings or performing such pattern recognitions may be referred to as a learning capability of the neural network. Such trained capabilities may also enable the specialized computational architecture to classify such an input pattern, or portion of the input pattern, as a member that belongs to one or more predetermined groups. Further, because of the specialized training, such specially trained neural network may thereby have a generalization capability of generating a relatively accurate or reliable output with respect to an input pattern that the neural network may not have been trained for, for example.

The off-chip memory 120 may have a larger memory capacity than the on-chip memory or internal memory in the accelerator 140. However, when the neural network is being executed, the cost to have the accelerator 140 accessing the off-chip memory 120 may be greater than the cost to have the accelerator 140 accessing the internal on-chip memory. A memory access cost may be power and/or time needed to access the corresponding memory and read or write data.

In an example, the accelerator 140 may be an artificial intelligence (AI) accelerator that infers data by executing the neural network based on the kernel transmitted from the host processor 110, and may be a separate processor that is different from the host processor 110. In a non-limiting example, the accelerator 140 may be a neural processing unit (NPU), a graphics processing unit (GPU), a tensor processing unit (TPU), and a digital signal processor (DSP), but is not limited thereto.

The accelerator 140 may process tasks that may be more efficiently processed by a separate exclusive processor (that is, the accelerator 140), rather than by the general-purpose host processor 110, due to the characteristics of the operations performed in the neural network. In this example, the on-chip memory, or internal memory and one or more processing elements (PEs) included in the accelerator 140 may be utilized. The on-chip memory may be included in the accelerator 140 to store data necessary for performing a computation of the accelerator 140 or a global shared buffer and/or a local buffer to store a computation result, and may be distinguished from the off-chip memory 120 located outside of the accelerator 140. In an example, the on-chip memory may include a scratchpad memory accessible through an address space, a static random-access memory (SRAM), or a system cache, but is not limited thereto.

A neural network may provide an optimal output corresponding to an input by mapping an input and an output that are in a non-linear relationship based on deep learning. Deep learning may be a machine learning method to solve given problems from a big data set and may be a process of optimizing the neural network by finding parameters (e.g., weights) or a model that represents a structure of the neural network. The neural network may include a plurality of layers (e.g., an input layer, a plurality of hidden layers, and an output layer). For example, the neural network may be a deep neural network (DNN), which may include an input layer to which input data is applied, an output layer for outputting a result derived through prediction based on training and the input data, and a plurality of hidden layers for performing a neural network operation between the input layer and the output layer.

In such an example, the DNN may be one or more of a fully connected network, a convolution neural network, a recurrent neural network, and the like, or may include different or overlapping neural network portions respectively with such full, convolutional, or recurrent connections, according to an algorithm used to process information. The neural network may be configured to perform, as non-limiting examples, object classification, object recognition, voice recognition, and image recognition by mutually mapping input data and output data in a nonlinear relationship based on deep learning. Such deep learning is indicative of processor implemented machine learning schemes for solving issues, such as issues related to automated image or speech recognition from a data set, as non-limiting examples. Herein, it is noted that use of the term 'may' with respect to an example or embodiment, e.g., as to what an example or embodiment may include or implement, means that at least one example or embodiment exists where such a feature is included or implemented while all examples and embodiments are not limited thereto.

Each of the layers may include a plurality of nodes (or neurons) that belong to different layers of adjacent layers. However, such reference to "neurons" is not intended to impart any relatedness with respect to how the neural network architecture computationally maps or thereby intuitively recognizes information, and how a human's neurons operate. In other words, the term "neuron" is merely a term of art referring to the hardware implemented nodes of a neural network, and will have a same meaning as a node of the neural network. Each node may be a calculation unit having one or more inputs and an output, and the nodes may be connected to each other. A weight may be set for a connection between nodes, and the weight may be adjusted or changed. As the weight increases, connectivity between corresponding two nodes is reinforced, and as the weight decreases, connectivity between two nodes is weakened. For example, the weight may have a value between 0 and 1, and when the weight is 0, no connectivity exists between two nodes. However, a numerical range of the weight is not limited thereto, and may be diversified according to the implementation method of a neural network, e.g., according to the various ranges and activation functions. The weight may amplify, reduce, or maintain a relevant data value, thereby determining a degree of influence of the data value on a final result. Weighted inputs of nodes included in a previous layer may be input to each node included in the output layer. A process of inputting weighted data from a preset layer to the next layer is referred to as propagation. For the convenience of description, a neural network described herein may also be referred to as a model.

In an example, the host processor 110 may co-locate a plurality of models to the accelerator 140 to process multiple received requests. When a plurality of models having various computational characteristics for each model are co-located to the accelerator 140 which has limited resources, an interference between the co-located models may occur such that the resources of the accelerator 140 are not fully utilized, and an operation may be inefficiently performed. To increase a utilization rate of the accelerator 140, the host processor 110 may schedule models to be co-located to the accelerator 140. Hereinafter, an operation of determining models to be co-located to the accelerator 140 is described with reference to the accompanying drawings.

Figure 2:
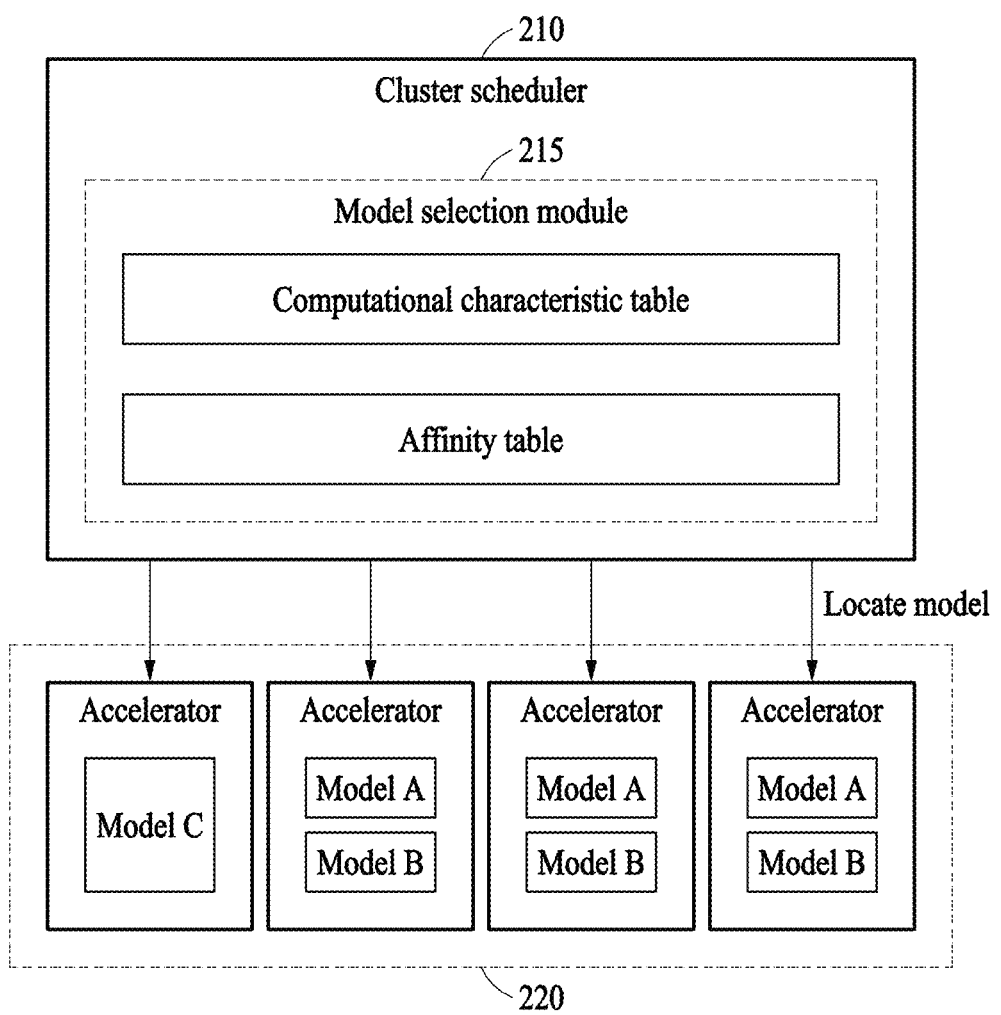
FIG. 2 illustrates an example operation by a cluster scheduler, in accordance with one or more embodiments.

FIG. 2 illustrates an example operation by a cluster scheduler, in accordance with one or more embodiments.

Referring to FIG. 2, a cluster scheduler 210 may locate one or more models in each of the plurality of accelerators 220 such that a utilization rate of the accelerators 220 is improved and may be implemented by, for example, the host processor 110 illustrated in FIG. 1. The cluster scheduler 210 may include a model selection module 215. When the one or more models are located in each of the plurality of accelerators 220, the model selection module 215 may include a computational characteristic table and an affinity table used by the cluster scheduler 210.

When each of the plurality of models is located in the accelerator, the cluster scheduler 210 may perform profiling to analyze a computational characteristic and store a result in the computational characteristic table. The computational characteristic table may include information associated with a performance of each model based on a memory capacity, a memory bandwidth, and a size of an intermediate buffer of each model. In an example, the cluster scheduler 210 may perform scheduling in which the computational characteristic of each model is reflected by utilizing the computational characteristic table.

When two models among the plurality of models are co-located to one accelerator based on computational characteristics of the plurality of models stored in the computational characteristic table, the cluster scheduler 210 may determine an affinity representing the utilization rate of a corresponding accelerator and store a result to the affinity table. An affinity may represent a utilization rate of an accelerator when models are co-located with one accelerator, and a low affinity may represent a higher interference between the co-located models.

The cluster scheduler 210 may co-locate the two models among the plurality of models to the same accelerator based on the affinity table. The cluster scheduler 210 may effectively improve a throughput of an entire system by minimizing an occurrence of a resource bottleneck and an interference between co-located models by performing scheduling utilizing the affinity.

The cluster scheduler 210 may identify a model having low utilization of computational resources due to a large memory capacity and/or memory bandwidth, select a model that may minimize resource interference with the corresponding model, and co-locate the model to one accelerator. Thus, a utilization rate of the accelerator may be maximized.

Figure 3:
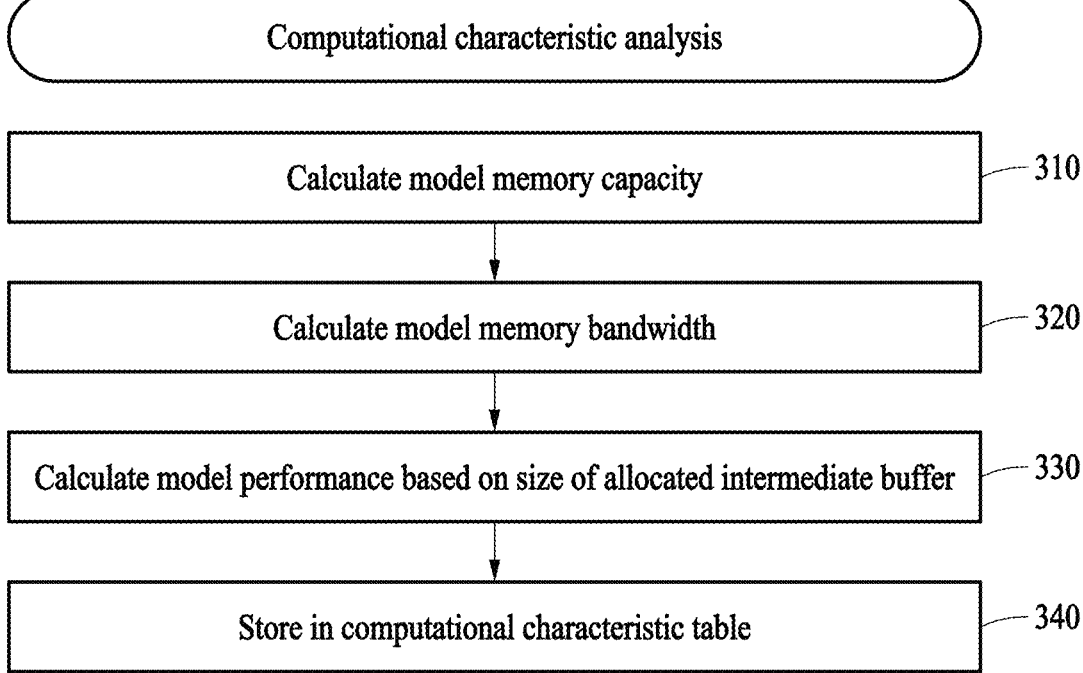
FIGS. 3 and 4 illustrate an example operation of analyzing computational characteristics, in accordance with one or more embodiments.
Figure 4:
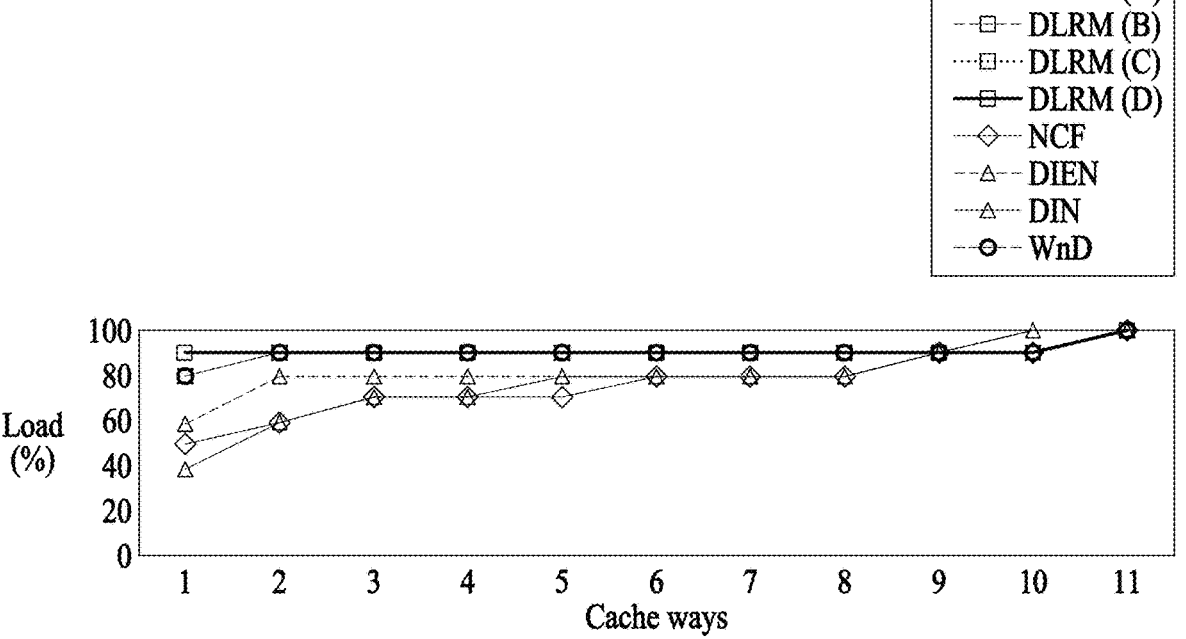

FIGS. 3 and 4 illustrate an example of an operation of analyzing computational characteristics. The operations in FIG. 3 may be performed in the sequence and manner as shown, although the order of some operations may be changed or some of the operations omitted without departing from the spirit and scope of the illustrative examples described. Many of the operations shown in FIG. 3 may be performed in parallel or concurrently. One or more blocks of FIG. 3, and combinations of the blocks, can be implemented by special purpose hardware-based computer that perform the specified functions, or combinations of special purpose hardware and computer instructions. In addition to the description of FIG. 3 below, the descriptions of FIGS. 1-2 are also applicable to FIG. 3, and are incorporated herein by reference. Thus, the above description may not be repeated here.

Referring to FIG. 3, an operation of analyzing computational characteristics of a plurality of models performed by a cluster scheduler is illustrated.

In operation 310, the cluster scheduler may measure a memory capacity of each model. The memory capacity may represent an amount of data that should be loaded into a memory to drive a model in an accelerator, and may include, for example, parameters of the model.

In operation 320, the cluster scheduler may measure a memory bandwidth of each model. The memory bandwidth may be needed to move data stored in the memory (e.g., the off-chip memory 120 in FIG. 1, etc.) to the accelerator for a model computation and include, for example, a read bandwidth and/or a write bandwidth.

In operation 330, the cluster scheduler may measure a performance of each model based on a size of an allocated intermediate buffer.

A performance of each model based on the size of the allocated intermediate buffer is described with reference to FIG. 4. When an accelerator utilizes a cache as an intermediate buffer, the cache may also cause an interference as a resource shared between the co-located models. When the accelerator has a function to divide a cache way, and the cache way is limited, a throughput of a corresponding model may be verified, and when the intermediate buffer is shared between the two models, an interference may be predicted.

In an example graph illustrated in FIG. 4, an x-axis represents a number of cache ways, and a y-axis represents a load corresponding to a performance of the model based on the number of cache ways. The number of cache ways may be proportional to the size of the allocated intermediate buffer. The cluster scheduler may determine the performance of each model based on the size of the allocated intermediate buffer by measuring the performance of each model based on the number of cache ways. In an example, when five cache ways are present, a performance of a neural collaborative filtering (NCF) model may be 70%.

To measure the performance of a model based on the number of cache ways illustrated in FIG. 4, the accelerator (e.g., a CPU, etc.) may need hardware characteristics limiting the number of cache ways that a model may utilize.

When the hardware characteristics limiting the number of available cache ways are not present, and the accelerator (e.g., a GPU, an NPU, etc.) uses a scratch pad as an intermediate buffer, the size of the scratch pad that the model utilizes may be limited. The cluster scheduler may determine a performance of each model based on the size of the allocated intermediate buffer by measuring the performance of the model based on the size of the utilizable scratch pad. In an example, when a total size of the scratch pad of the accelerator is 20 megabytes (MB), and a utilization size of the scratch pad determined for one model is 10 MB, the graph illustrated in FIG. 4 may represent a shape of a step function, which indicates a 0% load of the scratch pad on the x-axis having a size greater than or equal to 0 MB and less than 10 MB, and a 100% load of the scratch pad having a size between 10 MB to 20 MB.

Referring again to FIG. 3, in operation 340, the cluster scheduler may store the measured result in the computational characteristic table. To be described hereinafter, the cluster scheduler may determine an affinity between the two models based on the computational characteristic table.

Figure 5:
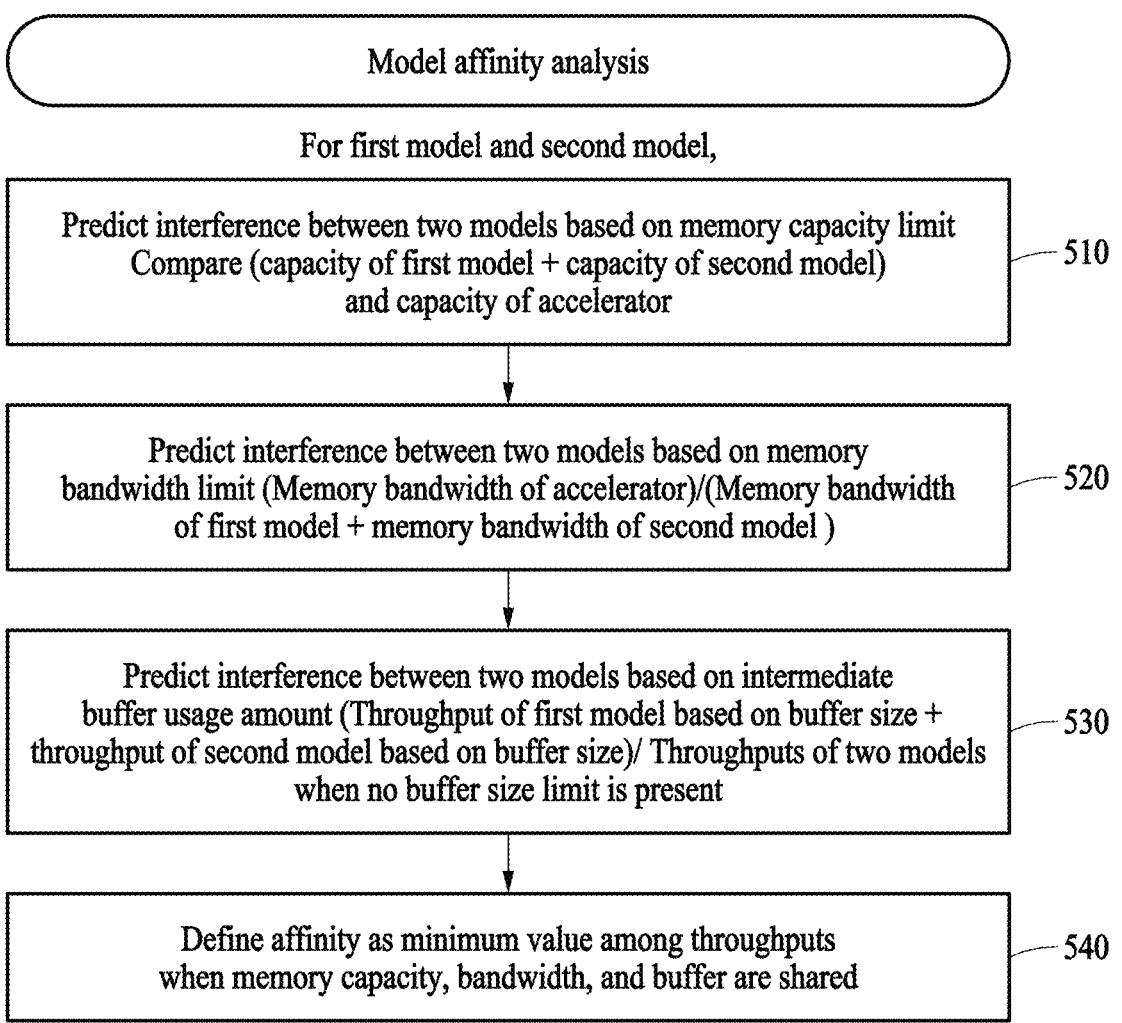
FIGS. 5 through 7 illustrate an example operation of determining an affinity, in accordance with one or more embodiments.
Figure 6:
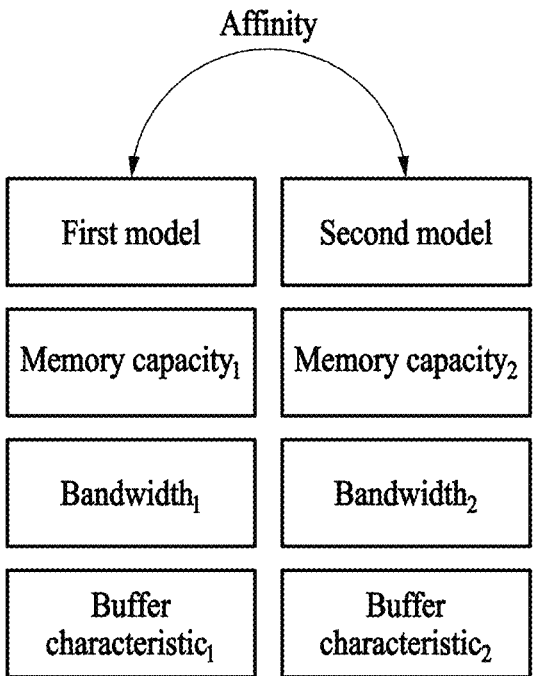
Figure 7:
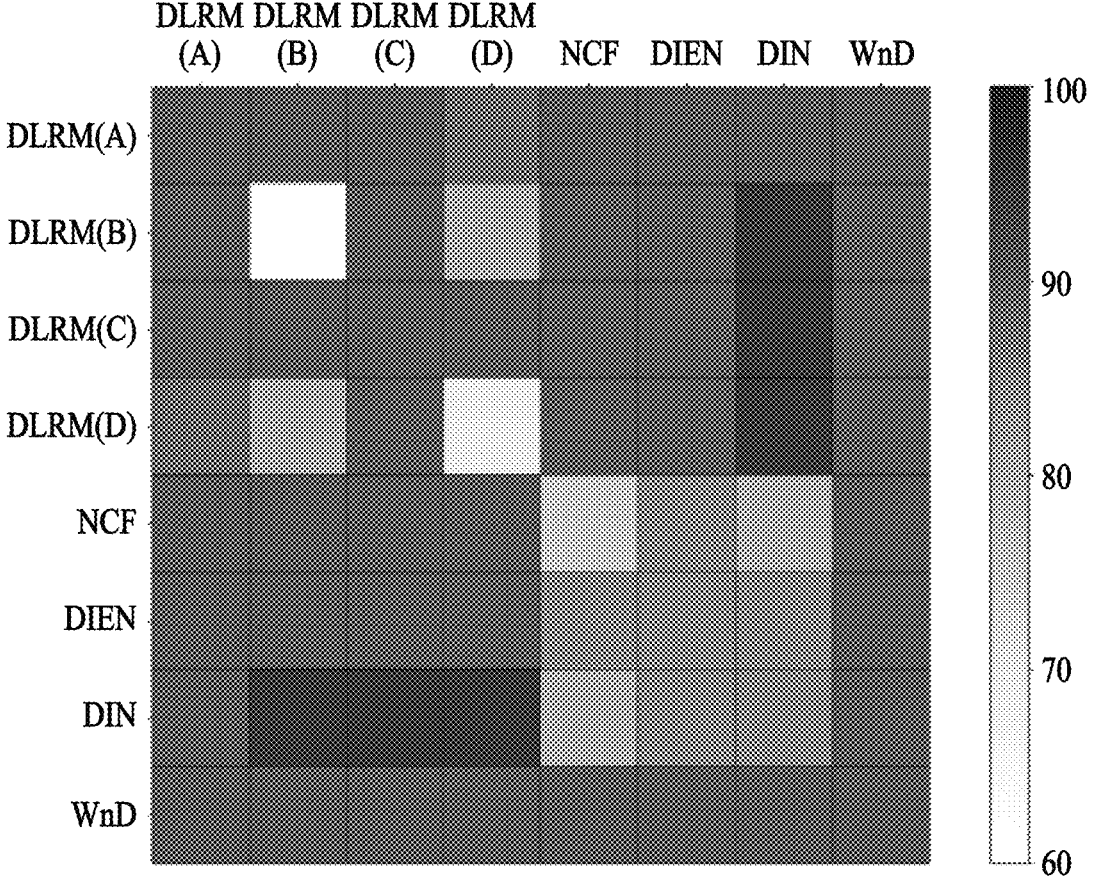

FIGS. 5 through 7 illustrate an example of an operation of determining an affinity, in accordance with one or more embodiments. The operations in FIG. 5 may be performed in the sequence and manner as shown, although the order of some operations may be changed or some of the operations omitted without departing from the spirit and scope of the illustrative examples described. Many of the operations shown in FIG. 5 may be performed in parallel or concurrently. One or more blocks of FIG. 5, and combinations of the blocks, can be implemented by special purpose hardware-based computer that perform the specified functions, or combinations of special purpose hardware and computer instructions. In addition to the description of FIG. 5 below, the descriptions of FIGS. 1-4 are also applicable to FIG. 5, and are incorporated herein by reference. Thus, the above description may not be repeated here.

Referring to FIG. 5, an example of an operation of analyzing an affinity between two models (e.g., a first model and a second model) is illustrated. A cluster scheduler may determine the affinity between the two models based on the computational characteristic table determined by an operation illustrated in FIG. 3. An affinity may represent a gain when the two models are co-located to the same accelerator and be expressed, for example, as a utilization rate of an accelerator in which the two models are co-located. The affinity may be expressed by Equation 1 below.

$$\text{Affinity} = CoAff_{capacity} \times CoAff_{bandwidth} \times (CoAff_{buffer1} + CoAff_{buffer2})/2 \qquad \text{Equation 1:}$$

In Equation 1, $CoAff_{capacity}$ denotes a memory capacity coefficient for an affinity, $CoAff_{bandwidth}$ denotes a bandwidth coefficient for the affinity, $CoAff_{buffer1}$ denotes an intermediate buffer coefficient of a first model for the affinity, and $CoAff_{buffer2}$ denotes an intermediate buffer coefficient of a second model for the affinity. Hereinafter, an operation of calculating each coefficient is described.

In operation 510, the cluster scheduler may determine the memory capacity coefficient by predicting an interference between the two models based on a memory capacity limitation. The memory capacity coefficient may be determined by Equation 2 below.

$$\text{if } Capacity_1 + Capacity_2 > Capacity_{System}: \qquad \text{Equation 2}$$
$$CoAff_{capacity} = 0$$
$$\text{else:}$$
$$CoAff_{capacity} = 1$$

In Equation 2, $Capacity_1$ denotes a memory capacity of a first model, $Capacity_2$ denotes a memory capacity of a second model, and $Capacity_{system}$ denotes a memory capacity of an accelerator (e.g., an on-chip memory and/or an off-chip memory).

When a sum of the memory capacity of the first model and the memory capacity of the second model is greater than a memory capacity of the accelerator, the memory capacity coefficient may be determined to be 0 because the first model and the second model may not be loaded into the accelerator at the same time. In contrast, when a sum of the memory capacity of the first model and the memory capacity of the second model is less than or equal to the memory capacity of the accelerator, the memory capacity coefficient may be determined to be 1 because first model and the second model may be loaded into the accelerator at the same time.

In operation 520, the cluster scheduler may determine a bandwidth coefficient by predicting an interference between two models based on a memory bandwidth limitation. The bandwidth coefficient may be determined by Equation 3 below.

$$\text{if } Bandwidth_1 + Bandwidth_2 > Bandwidth_{System}: \qquad \text{Equation 3}$$
$$CoAff_{bandwidth} = \frac{Bandwidth_{System}}{Bandwidth_1 + Bandwidth_2}$$
$$\text{else:}$$
$$CoAff_{bandwidth} = 1$$

In Equation 3, $Bandwidth_1$ denotes a bandwidth of a first model, $Bandwidth_2$ denotes a bandwidth of a second model, and $Bandwidth_{system}$ denotes a bandwidth of an accelerator.

When a sum of the bandwidth of the first model and the bandwidth of the second model is greater than the bandwidth of the accelerator, an interference may occur in the bandwidth because co-located models share the same bandwidth of the accelerator. Such interference may be represented as (memory bandwidth of the accelerator)/(memory bandwidth of the first model+memory bandwidth of the second model). In contrast, when the sum of the bandwidth of the first model and the bandwidth of the second model is less than or equal to the bandwidth of the accelerator, the bandwidth coefficient may be determined to be 1 because the interference does not occur in the bandwidth.

In operation 530, the cluster scheduler may determine an intermediate buffer coefficient by predicting the interference between the two models based on an intermediate buffer usage. The cluster scheduler may use a performance of each model based on a size of the intermediate buffer represented by the graph illustrated in FIG. 4 to determine the intermediate buffer coefficient.

In an example, when a total number of cache ways of the accelerator is 11, the cluster scheduler may allocate "a"

cache ways ("a" denotes a natural number between 1 and 10) to the first model, and when 11-"a" cache ways are allocated to the second model, the performance of each model may be predicted. The cluster scheduler may predict the performance of each model for a plurality of examples in which a cache way is to be allocated to the first model and the second model and determine the intermediate buffer coefficient for an example in which the highest model performance is predicted. In an example, when the first model is WnD, the second model is DIEN, and "a" is 4, a performance of the first model may be 90%, and a performance of the second model may be 80%. Thus, the cluster scheduler may determine $CoAff_{buffer1}$ to be 0.9 and $CoAff_{buffer2}$ to be 0.8. That is, the cluster scheduler may determine the intermediate buffer coefficient to be (0.9+0.8)/2=0.85.

In operation 540, the cluster scheduler may determine the affinity of the two models based on memory capacities, bandwidths, and throughputs (or performances) when the intermediate buffer is shared, and in such an example, the above-described Equation 1 may be used. The affinity may have a value between 0 and 1. The affinity may be higher as it becomes closer to 1.

Referring to FIG. 6, an affinity between a first model and a second model may be determined based on memory capacities, bandwidths, and buffer characteristics (e.g., a throughput when sharing an intermediate buffer). When the first model and the second model are co-located to the accelerator, the cluster scheduler may consider the overall maximum throughput that may be provided based on the memory capacities, the maximum throughput that may be provided based on memory bandwidths, and the maximum throughput that may be provided based on intermediate buffers. Thus, the cluster scheduler may determine the affinity between models accurately reflecting the throughput at a bottleneck. The affinity determined through such process may be used to minimize resource interference between the models sharing the accelerator and to maximize resource utilization.

Referring to FIG. 7, an example of an affinity between two models among a plurality of models is illustrated. DLRM(B) may be a model having capacity-limited characteristics, and when the DLRM(B) is co-located to an accelerator, a low affinity may represent that a performance is significantly lower. Additionally, DLRM(B) may indicate a low affinity with DLRM(D) having a bandwidth-limited characteristic. In contrast, when the DLRM(B) having capacity-limiting characteristics and the DIN having operation-limiting characteristics are co-located, a high affinity between the DLRM (B) and DIN may indicate high performance and high accelerator utilization.

Figure 8:
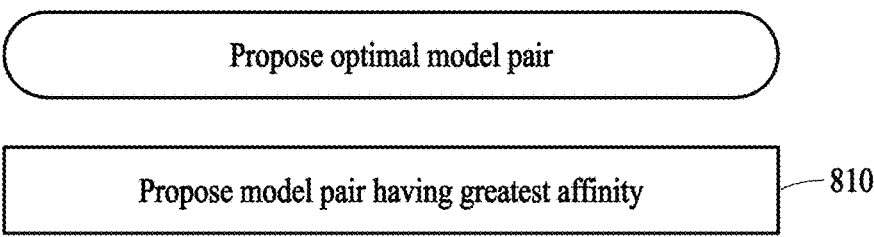
FIGS. 8 and 9 illustrate an example co-locating operation, in accordance with one or more embodiments.
Figure 9:
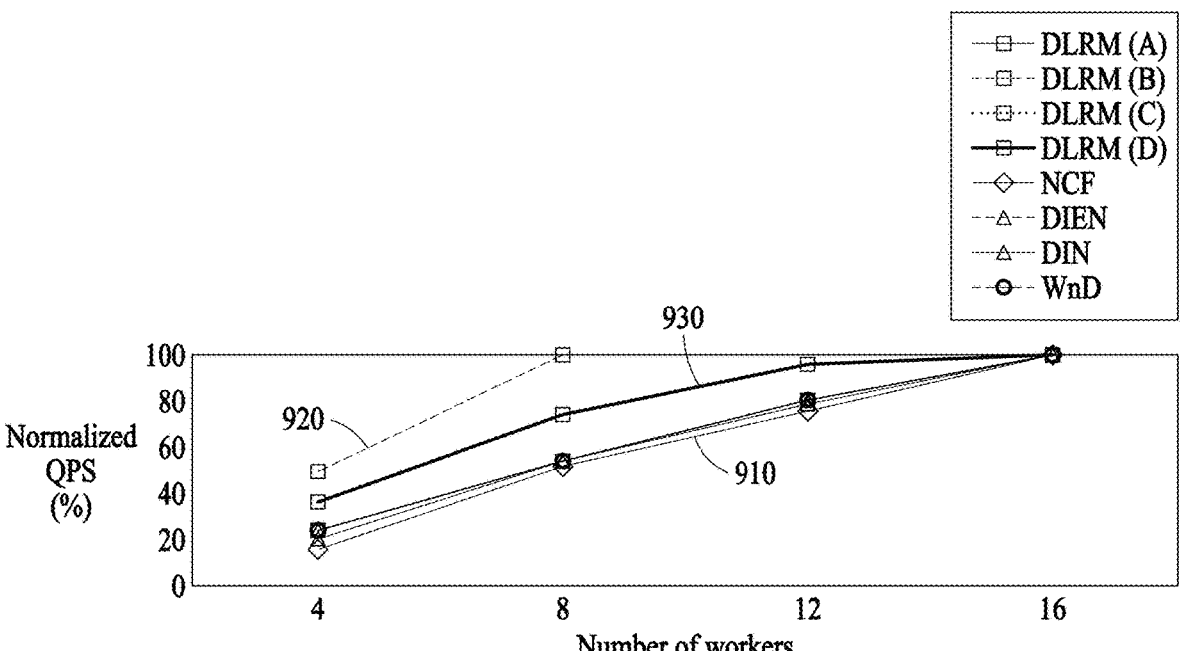

FIGS. 8 and 9 illustrate an example co-locating operation, in accordance with one or more embodiments.

Referring to FIG. 8, an example operation of proposing an optimal model pair to be co-located to the cluster scheduler is illustrated. In operation 810, a cluster scheduler may identify an optimal model pair based on an affinity, and co-locate the optimal model pair to the accelerator. Through such a scheduling operation, it is possible to identify a model pair that maximizes resource efficiency while considering a memory resource bottleneck, and utilization rate of the accelerator may be maximized.

Referring to FIG. 9, an example of a model being co-located to a cluster scheduler is illustrated. In an example graph illustrated in FIG. 9, an x-axis represents the number of workers, and the y-axis represents normalized queries per second (QPS). The QPS may correspond to a throughput and resource utilization.

The cluster scheduler may measure the resource utilization rate by increasing the number of workers in each model until the throughput may no longer be increased in a computational characteristic analysis process. In such an example, the collected resource utilization ratio may include a memory capacity utilization ratio and a memory bandwidth utilization ratio, and when an intermediate buffer such as a cache is present, the utilization ratio of the corresponding intermediate buffer may be included.

A first graph 910 may correspond to a model in which a throughput increases as the number of workers gradually increases, and a second graph 920 or a third graph 930 may correspond to a model in which a throughput initially increases based on an increase in the number of workers, but stops increasing when the number of workers reaches a set level. In an example, the second graph 920 may correspond to a model having a capacity-limiting characteristic, and the third graph 930 may correspond to a model having a bandwidth-limiting characteristic. A model having the capacity-limiting characteristic or a model having the bandwidth-limiting characteristic may correspond to a model in which a memory resource bottleneck occurs.

The cluster scheduler may select a model having a low utilization rate of computational resources due to the memory resource bottleneck from a computational characteristic analysis result (e.g., the graph illustrated in FIG. 9) and select a second model in which an affinity with the model is greater than or equal to a preset threshold, and the model may be co-located with the second model. Additionally, the cluster scheduler may select a model having low utilization rate of computational resources and a second model having the highest affinity and co-locate the model with the second model. Such co-location may maximize resource utilization.

Figure 10:
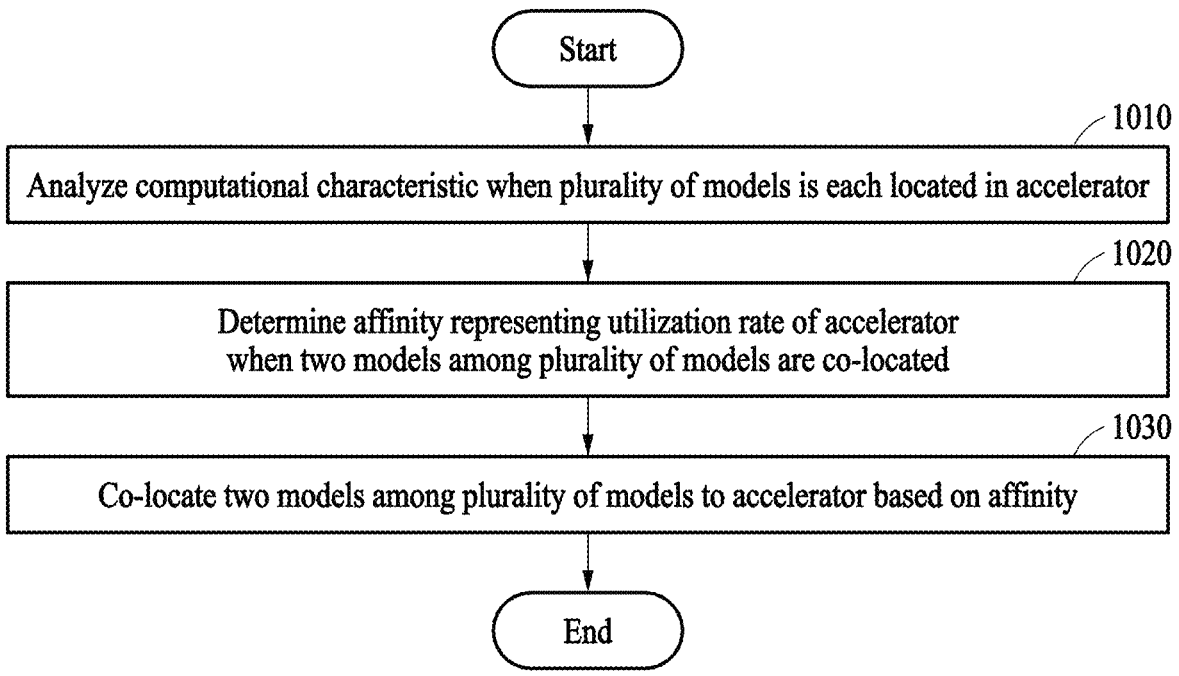
FIG. 10 illustrates an example method of operating an electronic device, in accordance with one or more embodiments.

FIG. 10 illustrates an example method of operating an electronic device, in accordance with one or more embodiments. The operations in FIG. 10 may be performed in the sequence and manner as shown, although the order of some operations may be changed or some of the operations omitted without departing from the spirit and scope of the illustrative examples described. Many of the operations shown in FIG. 10 may be performed in parallel or concurrently. One or more blocks of FIG. 10, and combinations of the blocks, can be implemented by special purpose hardware-based computer that perform the specified functions, or combinations of special purpose hardware and computer instructions. In addition to the description of FIG. 10 below, the descriptions of FIGS. 1-9 are also applicable to FIG. 10, and are incorporated herein by reference. Thus, the above description may not be repeated here.

Referring to FIG. 10, an example of an electronic device co-locating two models among a plurality of models to an accelerator is illustrated. Operations 1010 to 1030 may be performed by at least one component (e.g., a processor, etc.) of the electronic device.

In operation 1010, the electronic device may analyze computational characteristics when each of a plurality of models is assigned to the accelerator. The electronic device may analyze a performance of each model based on a memory capacity, a bandwidth needed by each of the plurality of models, and a size of the allocated intermediate buffer as computational characteristics.

In operation 1020, the electronic device may determine an affinity representing utilization rate of the accelerator when the two models among the plurality of models are co-located based on the computational characteristics among the plurality of models. The electronic device may determine the affinity based on whether a sum of memory capacities of the two models among the plurality of models is greater than a memory capacity of the accelerator. The electronic device may determine the affinity based on the sum of the band-widths of the two models among the plurality of models and the bandwidth of the accelerator. The electronic device may determine the affinity based on the sum of performances of the two models when the intermediate buffer of the accel-erator is distributed to two models among the plurality of models.

In operation 1030, the electronic device may co-locate the two models among the plurality of models to the accelerator based on the affinity. The electronic device may co-locate a first model in which a memory resource bottleneck occurs among a plurality of models and a second model in which an affinity with the first model is equal to or greater than a preset threshold in the accelerator.

The descriptions provided with FIGS. 1 to 9 may apply to operations illustrated in FIG. 10. Thus, a more detailed description of the operations is not included here, for brevity.

The electronic device 100, host processor 110, off-chip memory 120, memory controller 130, accelerator 140, and other apparatuses, units, modules, devices, and other com-ponents described herein and with respect to FIGS. 1-10, are implemented by hardware components. Examples of hard-ware components that may be used to perform the operations described in this application where appropriate include controllers, sensors, generators, drivers, memories, com-parators, arithmetic logic units, adders, subtractors, multi-pliers, dividers, integrators, and any other electronic com-ponents configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic control-ler, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or com-puter may execute instructions or software, such as an operating system (OS) and one or more software applica-tions that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hard-ware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configu-rations, examples of which include a single processor, independent processors, parallel processors, single-instruc-tion single-data (SISD) multiprocessing, single-instruction multiple-data (SIMD) multiprocessing, multiple-instruction single-data (MISD) multiprocessing, and multiple-instruc-tion multiple-data (MIMD) multiprocessing.

The methods that perform the operations described in this application and illustrated in FIGS. 1-10 are performed by computing hardware, for example, by one or more proces-sors or computers, implemented as described above execut-ing instructions or software to perform the operations described in this application that are performed by the methods. For example, a single operation or two or more operations may be performed by a single processor, or two or more processors, or a processor and a controller. One or more operations may be performed by one or more proces-sors, or a processor and a controller, and one or more other operations may be performed by one or more other proces-sors, or another processor and another controller, e.g., as respective operations of processor implemented methods. One or more processors, or a processor and a controller, may perform a single operation, or two or more operations.

Instructions or software to control computing hardware, for example, one or more processors or computers, to implement the hardware components and perform the meth-ods as described above may be written as computer pro-grams, code segments, instructions or any combination thereof, for individually or collectively instructing or con-figuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computers using an interpreter. The instructions or software may be written using any programming language based on the block diagrams and the flow charts illustrated in the drawings and the corresponding descriptions in the specifi-cation, which disclose algorithms for performing the opera-tions that are performed by the hardware components and the methods as described above.

The instructions or software to control computing hard-ware, for example, one or more processors or computers, to implement the hardware components and perform the meth-ods as described above, and any associated data, data files, and data structures, may be recorded, stored, or fixed in or on one or more non-transitory computer-readable storage media. Examples of a non-transitory computer-readable storage medium include read-only memory (ROM), ran-dom-access programmable read only memory (PROM), electrically erasable programmable read-only memory (EE-PROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

The above-described hardware devices may be configured to act as one or more software modules in order to perform the operations of the above-described examples, or vice versa.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An electronic device, comprising:
one or more of processors, configured to:
analyze computational characteristics in response to a plurality of models being located to an accelerator, the computational characteristics including bandwidths of the plurality of models and a bandwidth of the accelerator;
determine an affinity representing a utilization of the accelerator in response to two models among the plurality of models being co-located to the accelerator, the determining being based on a sum of bandwidths of the two models among the plurality of models in relation to the bandwidth of the accelerator to determine a maximum bandwidth coefficient reflected in the affinity in response to the sum of the bandwidths of the two models among the plurality of models being equal to, or less than, the bandwidth of the accelerator; and
co-locate the two models among the plurality of models to the accelerator based on the affinity at a same time to share memory resources of the accelerator.

2. The electronic device of claim 1, wherein the one or more of processors is further configured to:
analyze a memory capacity and a bandwidth needed by each of the plurality of models, and a performance of each of the plurality of models based on a size of an allocated intermediate buffer as the computational characteristics.

3. The electronic device of claim 1, wherein the one or more of processors is further configured to:
determine the affinity based on a determination that a sum of memory capacities of the two models among the plurality of models is greater than a memory capacity of the accelerator.

4. The electronic device of claim 1, wherein the one or more of processors is further configured to:
determine a result of dividing the bandwidth of the accelerator by the sum of the bandwidths of the two models among the plurality of models as a bandwidth coefficient reflected in the affinity in response to the sum of the bandwidths of the two models being greater than the bandwidth of the accelerator.

5. The electronic device of claim 1, wherein the one or more of processors is further configured to:
determine the affinity based on a sum of performances of the two models in response to an intermediate buffer of the accelerator being distributed to the two models among the plurality of models.

6. The electronic device of claim 5, wherein the one or more of processors is further configured to:
determine an average of a sum of maximum performances of the two models among the plurality of models as an intermediate buffer coefficient reflected in the affinity in response to the intermediate buffer of the accelerator being distributed to the two models among the plurality of models.

7. The electronic device of claim 1, wherein the one or more of processors is further configured to:
co-locate the two models among the plurality of models to the accelerator in response to the affinity being equal to, or greater than, a preset threshold.

8. The electronic device of claim 1, wherein the one or more of processors is further configured to:
co-locate a first model in which a memory resource bottleneck occurs, and a second model in which the affinity with the first model is equal to, or greater than, a preset threshold among the plurality of models.

9. A processor-implemented method, the method comprising:
analyzing computational characteristics in response to a plurality of models being located to an accelerator, the computational characteristics including performances of the plurality of models and a bandwidth of the accelerator;
determining an affinity representing a utilization of the accelerator in response to two models among the plurality of models being co-located to the accelerator based on a sum of performances of two models among the plurality of models in response to an intermediate buffer of the accelerator being distributed to the two models among the plurality of models to determine an average of a sum of maximum performances of the two models as an intermediate buffer coefficient reflected in the affinity in response to the intermediate buffer of the accelerator being distributed to the two models among the plurality of models; and
co-locating the two models among the plurality of models to the accelerator based on the affinity at a same time to share memory resources of the accelerator.

10. The method of claim 9, wherein the analyzing of the computational characteristics comprises:
analyzing a memory capacity and a bandwidth needed by each of the plurality of models, and a performance of each of the plurality of models based on a size of an allocated intermediate buffer as the computational characteristics.

11. The method of claim 9, wherein the determining of the affinity comprises:

determining the affinity based on a determination that a sum of memory capacities of the two models among the plurality of models is greater than a memory capacity of the accelerator.

12. The method of claim 9, wherein the determining of the affinity comprises:

determining a result of dividing the bandwidth of the accelerator by the sum of the bandwidths of the two models among the plurality of models as a bandwidth coefficient reflected in the affinity in response to the sum of the bandwidths of the two models being greater than the bandwidth of the accelerator.

13. The method of claim 9, wherein the determining of the affinity comprises:

determining the bandwidth coefficient reflected in the affinity in response to the sum of the bandwidths of the two models among the plurality of models being equal to, or less than, the bandwidth of the accelerator.

14. The method of claim 9, wherein the co-locating comprises:

co-locating a first model in which a memory resource bottleneck occurs and a second model in which an affinity with the first model is equal to, or greater than, a preset threshold among the plurality of models.

15. A non-transitory computer-readable storage medium storing instructions that, when executed by a processor, cause the processor to perform the method of claim 9.

\* \* \* \* \*